US010810377B2

(12) United States Patent
Krishnan et al.

(10) Patent No.: US 10,810,377 B2
(45) Date of Patent: Oct. 20, 2020

(54) METHOD AND SYSTEM FOR INFORMATION RETREIVAL

(71) Applicant: BOOMI, INC., Round Rock, TX (US)

(72) Inventors: Ravikiran Krishnan, San Mateo, CA (US); Ayush Parashar, Foster City, CA (US); Deepak Chandrasekar, San Mateo, CA (US); Christopher Pedrotti, San Mateo, CA (US)

(73) Assignee: Boomi, Inc., Round Rock, TX (US)

( * ) Notice: Subject to any disclaimer, the term of this patent is extended or adjusted under 35 U.S.C. 154(b) by 428 days.

(21) Appl. No.: 15/690,193

(22) Filed: Aug. 29, 2017

(65) Prior Publication Data

US 2018/0218066 A1     Aug. 2, 2018

Related U.S. Application Data

(60) Provisional application No. 62/452,905, filed on Jan. 31, 2017.

(51) Int. Cl.
| | |
|---|---|
| *G06F 40/00* | (2020.01) |
| *G06F 40/30* | (2020.01) |
| *G06F 16/33* | (2019.01) |
| *G06F 16/36* | (2019.01) |
| *G06F 16/93* | (2019.01) |
| *G06F 16/34* | (2019.01) |
| *G06F 16/951* | (2019.01) |

(52) U.S. Cl.
CPC .......... *G06F 40/30* (2020.01); *G06F 16/3334* (2019.01); *G06F 16/36* (2019.01); *G06F 16/93* (2019.01); *G06F 16/34* (2019.01); *G06F 16/951* (2019.01)

(58) Field of Classification Search
CPC ............. G06F 16/2455; G06F 16/2457; G06F 16/248; G06F 16/25; G06F 16/3322; G06F 16/3334; G06F 16/34; G06F 16/36; G06F 16/93; G06F 16/951
See application file for complete search history.

(56) References Cited

U.S. PATENT DOCUMENTS

| | | | |
|---|---|---|---|
| 5,963,946 A | 10/1999 | Yanagimoto | |
| 6,701,318 B2 | 3/2004 | Fox et al. | |
| 7,702,677 B2 | 4/2010 | Chang et al. | |
| 8,230,364 B2 | 7/2012 | Trepess | |
| 9,578,027 B1 | 2/2017 | Sutaria et al. | |
| 9,715,496 B1 * | 7/2017 | Sapoznik | G06F 16/245 |
| 2001/0053968 A1 * | 12/2001 | Galitsky | G06F 16/38 704/9 |

(Continued)

*Primary Examiner* — Diedra McQuitery
(74) *Attorney, Agent, or Firm* — Krishnendu Gupta; Sean Evans (57) ABSTRACT

A method and system for retrieving information from a plurality of data stores associated with the enterprise data universe are provided. The method includes causing display of a user interface (UI) on an electronic device associated with a user. A natural language query provided by the user using the UI is received and parsed to generate a plurality of query elements. A grammar-based analysis of the plurality of query elements is performed and an expression is generated based on the grammar-based analysis of the plurality of query elements. At least one answer to the query is retrieved from a knowledge base using the expression. The retrieved answer is provisioned to the user on the UI.

20 Claims, 7 Drawing Sheets

(56) References Cited

U.S. PATENT DOCUMENTS

| | | | |
|---|---|---|---|
| 2006/0123045 A1* | 6/2006 | Chang | G06F 17/2881 |
| 2007/0074123 A1 | 3/2007 | Omura et al. | |
| 2007/0185831 A1 | 8/2007 | Churcher | |
| 2008/0091408 A1* | 4/2008 | Roulland | G06F 16/3338 |
| | | | 704/9 |
| 2011/0295688 A1* | 12/2011 | Shen | G06Q 30/0241 |
| | | | 705/14.54 |
| 2013/0041921 A1* | 2/2013 | Cooper | G06F 16/3338 |
| | | | 707/780 |
| 2013/0262501 A1* | 10/2013 | Kuchmann-Beauger | |
| | | | G06F 16/9024 |
| | | | 707/769 |
| 2015/0269467 A1 | 9/2015 | Larsen et al. | |
| 2016/0283463 A1* | 9/2016 | M R | G06F 16/243 |
| 2016/0373456 A1* | 12/2016 | Vermeulen | G06F 16/245 |
| 2017/0109355 A1* | 4/2017 | Li | G06N 3/0445 |
| 2017/0206254 A1 | 7/2017 | Ogasawara | |
| 2017/0372190 A1* | 12/2017 | Bishop | G06N 20/00 |

* cited by examiner

| Q FILTER | STRUCTURED DATASET METRICS | | | 178 COLUMN(S) | | 20 ROW(S) | | | |
|---|---|---|---|---|---|---|---|---|---|
| INT ⌄ ID | DAT ⌄ DATE | INT ⌄ UNIX_FROM_TS | STR ⌄ UNIX_TO_TS | STR ⌄ CODE_VER | STR ⌄ POST_COOKIES | INT ⌄ NEW_VISIT | IPV ⌄ IP | | |
| 1331799426 | 2012-03-15 01:17:06 | 2860005755985467733 | 4611687631188657821 | FAS-2.8-AS3 | N | 0 | 99.122.210.248 | | |
| 1331800486 | 2012-03-15 01:34:46 | 2859997896193943381 | 6917530184062522031 | FAS-2.8-AS3 | N | 0 | 69.76.12.213 | | |
| 1331857433 | 2012-03-15 17:23:53 | 2781404195155152050 | 6917530222217899298З | FAS-2.8-AS3 | N | 0 | 67.240.15.94 | | |
| ..... | ..... | ..... | ..... | ..... | ..... | ..... | ..... | | |
| ..... | ..... | ..... | ..... | ..... | ..... | ..... | ..... | | |

METHOD AND SYSTEM FOR INFORMATION RETREIVAL

TECHNICAL FIELD

The present invention generally relates to information retrieval mechanisms and more specifically to systems and methods for information retrieval from multiple data stores using a conversational form of communication.

BACKGROUND

Enterprise data universe may encompass structured and unstructured data stored in a plurality of data stores spread across various locations. Some non-exhaustive examples of data stores include on-premise data stores, cloud-based data stores, networked storage systems, and the like.

Retrieving information from the data stores has been a challenging task due to existence of various structures and formats associated with the individual data stores. For example, a data store may store sensor data in a proprietary format, whereas relational databases or databases storing spreadsheets may store data in a different format. An application developed for retrieving data from a particular data store, typically cannot be used for other data stores for information retrieval purpose until further programming to integrate information stored in respective data stores is performed. Further, information contained in a typical data store is usually limited, thereby necessitating access to other data stores, and resulting in a programming effort for information retrieval from the multiple data stores.

Further, in order to attain widest possible domain of knowledge, natural language may be used to store information in at least some data stores. For example, the World Wide Web (WWW) uses natural language to store and access knowledge in the networked systems. Though amount of data stored using natural language may be enormous, searching for particular information from among the knowledge stored in such data stores has been known to be tedious. Usually a user may provide a search keyword or a key string corresponding to the information to be retrieved to a search engine of the data store, which may provide several search results related to the requested information. The user usually has to manually sift through the search results to locate the desired information. Some conventional mechanisms suggest techniques to improve relevance of the search results provided by the search engine, however the fundamental problems of indexing and searching of information using the search keyword still persist.

Accordingly, there is a need to overcome the aforementioned drawbacks in retrieving information from multiple data stores. Further, there is a need to reduce cognitive burden on the user to locate the information from the multiple data stores.

SUMMARY

Various embodiments of the present disclosure provide systems and methods for facilitating information retrieval from data stored in multiple data stores.

An example method includes causing display of a user interface (UI) on an electronic device associated with a user. The UI is configured to receive user inputs. The method includes receiving a query in a natural language form provided by the user using the UI and parsing the query to generate a plurality of query elements. The method includes performing a grammar-based analysis of the plurality of query elements and generating an expression based on the grammar based analysis of the plurality of query elements. The method further includes retrieving at least one answer to the query from a knowledge base using the expression. The knowledge base includes data stored in a plurality of data stores related with an enterprise. The method includes provisioning the at least one answer to the user on the UI.

An example information retrieval system includes a knowledge base, at least one processing engine and a memory. The knowledge base is configured to include data imported from a plurality of data stores related with an enterprise. The at least one processing engine is communicably coupled with the knowledge base. The memory stores therein machine executable instructions, that when executed by the at least one processing engine, cause the information retrieval system to cause display of a user interface (UI) on an electronic device associated with a user. The UI is configured to receive user inputs. The system receives a query in a natural language form provided by the user using the UI and parses the query to generate a plurality of query elements. The system performs a grammar-based analysis of the plurality of query elements and generates an expression based on the grammar-based analysis of the plurality of query elements. The system retrieves at least one answer to the query from the knowledge base using the expression and provisions the at least one answer to the user on the UI.

Another example information retrieval system includes a knowledge base, a parsing module, an expression building module and a discovery module. The knowledge base is configured to comprise data imported from a plurality of data stores related with an enterprise. The parsing module is configured to parse a natural language query of a user to generate a plurality of query elements. The natural language query is provided by the user using a user interface (UI) displayed on an electronic device associated with the user to retrieve information from the knowledge base. The parsing module is capable of performing a grammar-based analysis of the plurality of query elements. The expression building module is communicably coupled with the parsing module and is configured to generate an expression based on the grammar-based analysis of the plurality of query elements. The discovery module is communicably coupled with the expression building module and the knowledge base and is configured to retrieve at least one answer to the query from the knowledge base using the expression. The at least one answer is provisioned to the user on the UI.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Typical data stores, also referred to herein as knowledge sources, have a fixed format and structure of storing information, which may limit a user from retrieving the information. The user may need to be specialized or trained in a query language programmed to interface with such knowledge sources for purpose of retrieving information. Other knowledge sources may provide a natural language interface where the user may query a data store using natural language form. The information retrieval systems that interface with natural language interfaces usually provide several results deemed to be matching to the query. The user may have to manually sift through the search results for locating the desired information, which puts cognitive burden on the user to locate the desired information.

Various embodiments of the present technology provide a method and system that are capable of overcoming these and other obstacles and providing additional benefits. More specifically, various embodiments of the present technology disclose an information retrieval system for efficient information retrieval from multiple data stores. The system provisions a natural language interface that enables a user to provision a query in a natural language format. The query may inquire for information stored in a knowledge base of the system. A processing engine of the system is configured to parse the query and generate an expression bearing an internal format compatible with structured data of the knowledge base. The system may further process the expression to produce an answer to the query. Exemplary systems and processes for facilitating information retrieval are explained with reference to FIGS. 1 to 10.

Figure 1:
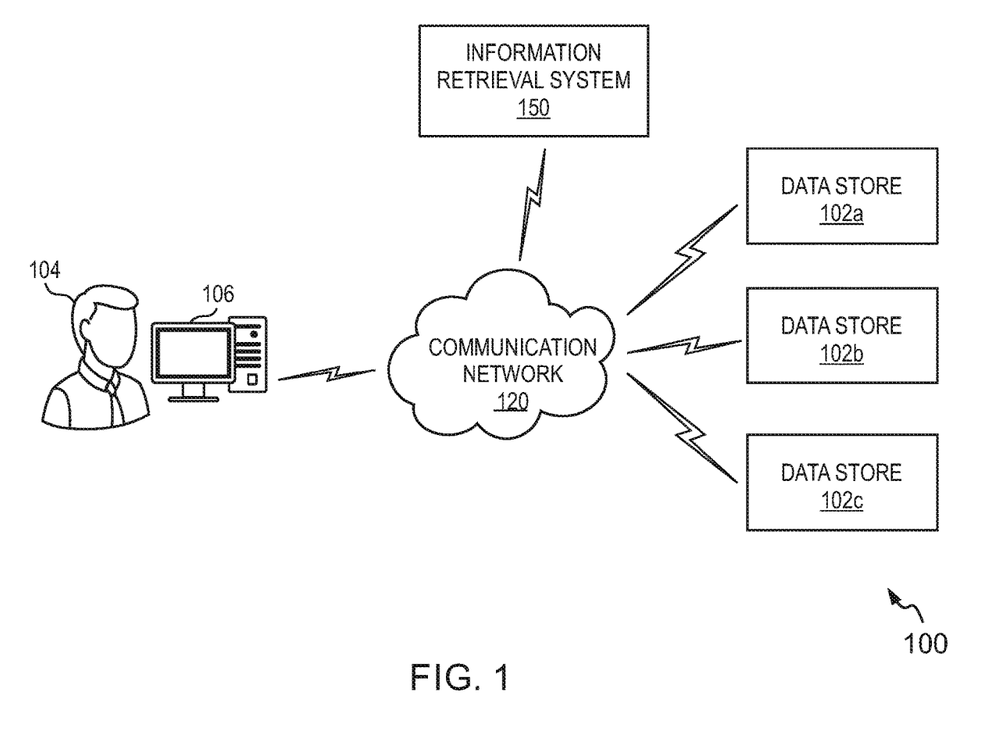
FIG. 1 illustrates an environment in which various embodiments of the present invention may be practiced.

FIG. 1 illustrates an environment 100 in which various embodiments of the present invention may be practiced. The environment 100 depicts a plurality of data stores, such as data store 102a, data store 102b and data store 102c storing structured and unstructured data related to an enterprise data universe. The term 'enterprise' as used herein may refer to a public corporation, a private firm, a public-private partnership venture, an institution, a non-governmental organization or any such an entity. For example, the enterprise may correspond to a listed E-commerce company. In another illustrative example, the enterprise may correspond to a private equity (PE) firm. In yet another illustrative example, the enterprise may correspond to a state-owned banking enterprise.

The environment 100 depicts an enterprise user 104 using an electronic device 106 to access information stored in a data store from among the plurality of data stores. In at least one example embodiment, an enterprise user, such as the enterprise user 104, may correspond to an information technology (IT) professional, a data scientist, a business analyst such as for example a retention analyst, a risk analyst or a marketing executive, or any such individual within the enterprise tasked with analyzing enterprise data for performing a variety of tasks, such as identifying trends, obtaining actionable insights, checking key metrics, and the like. It is noted that the electronic device 106 is depicted to be a desktop computer for illustration purpose. The enterprise user 104 may use any electronic device, such as a laptop computer, a tablet computer, a workstation, a Smartphone, a cellular phone, a wearable device, and the like to access information stored in a data store over a communication network 120. Examples of the communication network 120 may include wired networks, wireless networks or a combination thereof. Examples of the wired networks may include Ethernet, local area networks (LAN), fiber-optic cable networks and the like. Examples of the wireless networks may include cellular networks like GSM/3G/4G/CDMA networks, wireless LAN, blue-tooth or Zigbee networks and the like. An example of a combination of the wired and wireless networks may include the Internet. It is understood that several enterprise users, such as the enterprise user 104 may access information stored in the plurality of data stores over the communication network 120.

The environment 100 further depicts an example representation of an information retrieval system 150. The information retrieval system 150 is hereinafter referred to as system 150. The system 150 is configured to facilitate information retrieval from multiple data stores related to the enterprise using a natural language form of communication. As the information from multiple data stores can be retrieved using natural language form, an enterprise user such as the enterprise user 104, may not need to be trained on a particular programming language to interact and retrieve data from a particular data store. Moreover, the system 150 is configured to provide substantially relevant answers to the queries of the enterprise users while precluding the effort on part of the user to manually sift through several search results, structure the data associated with the results and perform analysis to determine answers to their queries, thereby reducing cognitive burden on the users. The various components of the information retrieval system are explained next with reference to FIG. 2.

Figure 2:
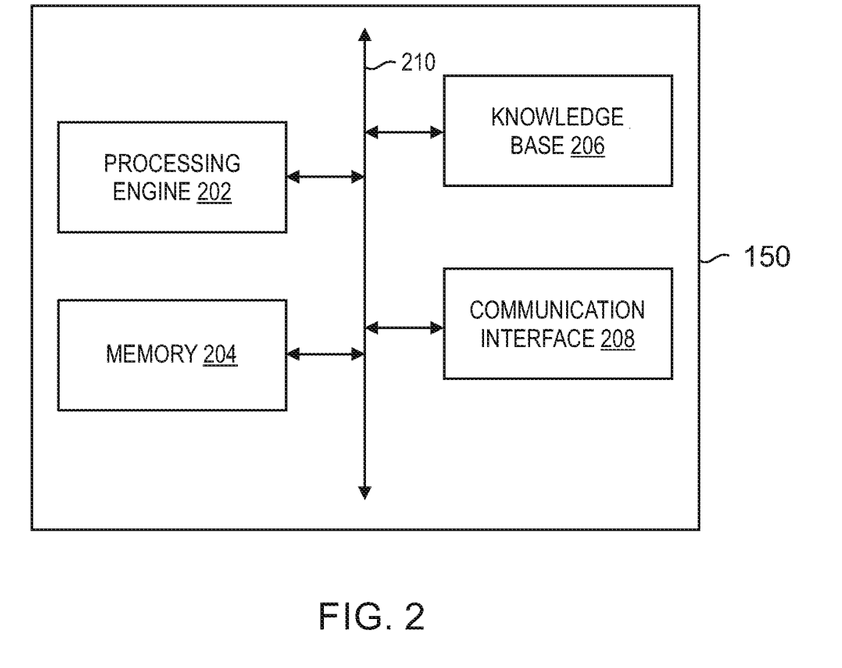
FIG. 2 is a block diagram of a system configured to facilitate information retrieval from a plurality of data stores, in accordance with an example embodiment of the invention.

FIG. 2 is a block diagram of the system 150 of FIG. 1 configured to facilitate information retrieval from a plurality of data stores, in accordance with an example embodiment of the invention. It is noted that in at least some embodiments, as part of information retrieval, the software platform may be configured to facilitate data integration (i.e. integrating data imported from multiple data stores), data cataloging (i.e. creating datasets from imported data) and data preparation (i.e. visually representing data). In at least one example embodiment, the system 150 is embodied as software platform capable of being accessed via a communication network, such as the communication network 120. In an embodiment, the software platform may be implemented as a set of software layers on top of existing hardware systems. In an embodiment, the system 150 may be implemented as a standalone component in a remote machine, such as cloud based server or a Web server, connected to a communication network 120 and capable of executing a set of instructions (sequential and/or otherwise) to facilitate information retrieval from a plurality of data stores. Moreover, the system 150 may be implemented as a centralized system, or, alternatively, the various components of the system 150 may be deployed in a distributed manner while being operatively coupled to each other. In an embodiment, one or more functionalities of the system 150 may also be embodied as a client within devices, such as electronic devices of enterprise users. In another embodiment, the system 150 may be a central system that is shared by or accessible to each of such devices. In some embodiments, the system 100 may be embodied as a hybrid of a semantic web and a multi-layered, self-organized, context-dependent, artificial neural net.

The system 150 is depicted to include at least one processing engine such as the processing engine 202, a memory 204, a database referred to herein as knowledge base 206, and a communication module 208. In an embodiment, the memory 204 is capable of storing machine executable instructions, referred to herein as platform instructions. Further, the processing engine 202 is capable of executing the platform instructions. In an embodiment, various components of the system 150, such as the processing engine 202, the memory 204, the knowledge base 206 and the communication module 208 are configured to communicate with each other via or through a centralized circuit system 210. The centralized circuit system 210 may be various devices configured to, among other things, provide or enable communication between the components (202-208) of the system 150. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

In an embodiment, the processing engine 202 may be embodied as a multi-core processor, a single core processor, or a combination of one or more multi-core processors and one or more single core processors. For example, the processing engine 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing engine 202 may be configured to execute hard-coded functionality. In an embodiment, the processing engine 202 is embodied as an executor of software instructions, wherein the instructions may specifically configure the processing engine 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In an embodiment, the knowledge base 206 (i.e. the database) may be implemented as a relational database, a centralized database, a distributed database, an object oriented database, or a flat database. In some embodiments, the centralized circuit system 210 may include appropriate storage interfaces to facilitate communication between the processing engine 202 and the knowledge base 206. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing engine 202 with access to the information stored in the knowledge base 206.

In at least one embodiment, the communication module 208 includes communication circuitry such as for example, a transceiver circuitry including antenna and other communication media interfaces to connect to wired and/or wireless networks (such as for example, the communication network 120 shown in FIG. 1). The communication circuitry may, in at least some example embodiments, enable transmission of data signals and/or reception of signals from remote network entities, such as electronic devices of enterprise users and public and private data stores storing data associated with the enterprise data universe.

It is noted that the system 150 as illustrated and hereinafter described is merely illustrative of an apparatus that could benefit from embodiments of the invention and, therefore, should not be taken to limit the scope of the invention. It is noted that the system 150 may include fewer or more components than those depicted in FIG. 2.

In at least one example embodiment, the system 150 embodied as a platform may be accessible over the communication network 120 using a Web browser application. More specifically, an enterprise user may launch a Web browser application installed in an electronic device associated with the user and thereafter access the system 150 using a uniform resource locator (URL) associated with the system 150. Alternatively, the system 150 may be configured to provide a thin client interface or an instance of an application capable of being downloaded on the electronic device of the enterprise user. The enterprise user may then launch the application to connect to the system 150 over the communication network 120 and access the system 150. In at least some example embodiments, the enterprise user may register with the platform on first-time access and thereafter use a login ID and password to access the system 150. The user registration and subsequent login may be performed using well-known techniques for user registration and access to software platforms and are not explained herein.

In at least some embodiments, the system 150 may be configured to cause display of an UI upon successful login of an enterprise user. The UI may provide an option to the enterprise user (also interchangeably referred to as 'user' hereinafter) to provide user input related to source of each data store from among the plurality of data stores related with the enterprise. In an embodiment, the user may provide user input related to source of each data store from among the plurality of data stores related with the enterprise. The term 'source of each data store' as used herein refers to a Web address identifying a location associated with the data store. An example user input related to a source of a data store is shown in FIG. 3.

Figure 3:
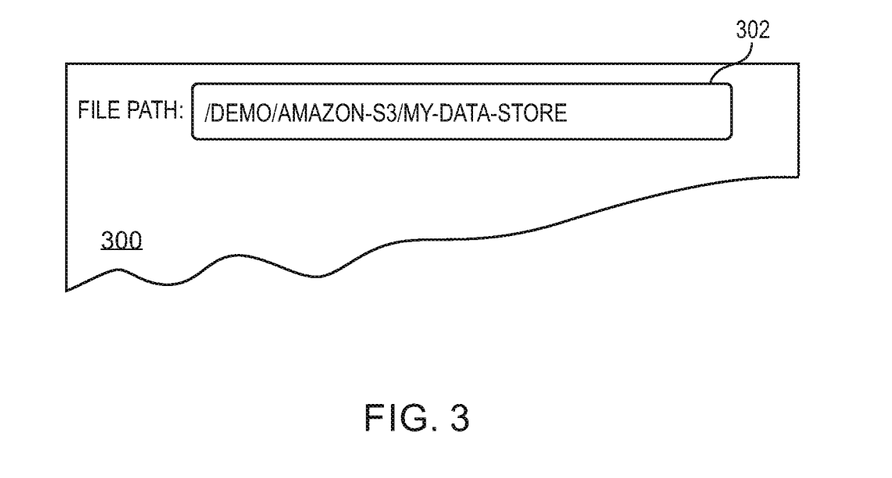
FIG. 3 shows a simplified representation of a user interface (UI) displayed to an enterprise user by the system of FIG. 2, in accordance with an example embodiment of the invention.

Referring now to FIG. 3, a simplified representation of a user interface (UI) 300 displayed to an enterprise user is shown, in accordance with an example embodiment of the invention. It is noted that the UI 300 may include several other components not shown in FIG. 3 and a simplified representation is shown herein for illustration purposes. The UI 300 is depicted to show a form field 302 capable of receiving user input related to the source of the data store. The enterprise user is exemplarily depicted to have provided the input as '/DEMO/AMAZON-S3/MY-DATA-STORE'. It is noted that the provisioning of the location of a cloud-based data store is mentioned herein for illustration purposes. In some embodiments, the enterprise user may provide source of public or private data stores storing structured and/or unstructured data. For example, the user may provide source of data stores, such as one or more relational databases, one or more file systems, one or more on-premise data storage systems and one or more cloud-based data storage systems.

Referring back to FIG. 2, in at least some embodiments, the communication module 208 may be configured to receive the user input related to the source of one or more data stores provided by the enterprise user. The communication module 208 may be configured to establish connection with each data store using the user input related to the respective source. In some embodiments, the system 150 may be configured to connect to exposed application programming interfaces (APIs) of the respective data sources over secure (or encrypted) communication links to import data from each data store subsequent to establishing respective connection. In at least some embodiments, the data imported from the multiple data stores together configures a knowledge base, such as the knowledge base 206 shown in FIG. 2. In at least one example embodiment, the knowledge base 206 may be auto-constructed and updated by the system 150 by including relevant information from the enterprise data universe.

In at least some example embodiments, the processing engine 202 of the system 150 is configured to create datasets from the imported data. For example, the processing engine 202 may be configured to receive imported data in JavaScript Object Notation (JSON) format. The processing engine 202 may be configured to parse the content to automatically create a dataset comprising rows and columns. The column headings may correspond to attributes derived from parsing of the imported data. The enterprise user may add/delete rows or columns, edit attribute names or in general customize the dataset based on his/her respective requirement. The processing engine 202 may generate a catalog comprising multiple datasets. In some embodiments, the processing engine 202 may also be configured to create a catalog of metadata from the data imported from the plurality of data stores. An example dataset comprising data in a tabular form is shown in FIG. 4.

Figure 4:
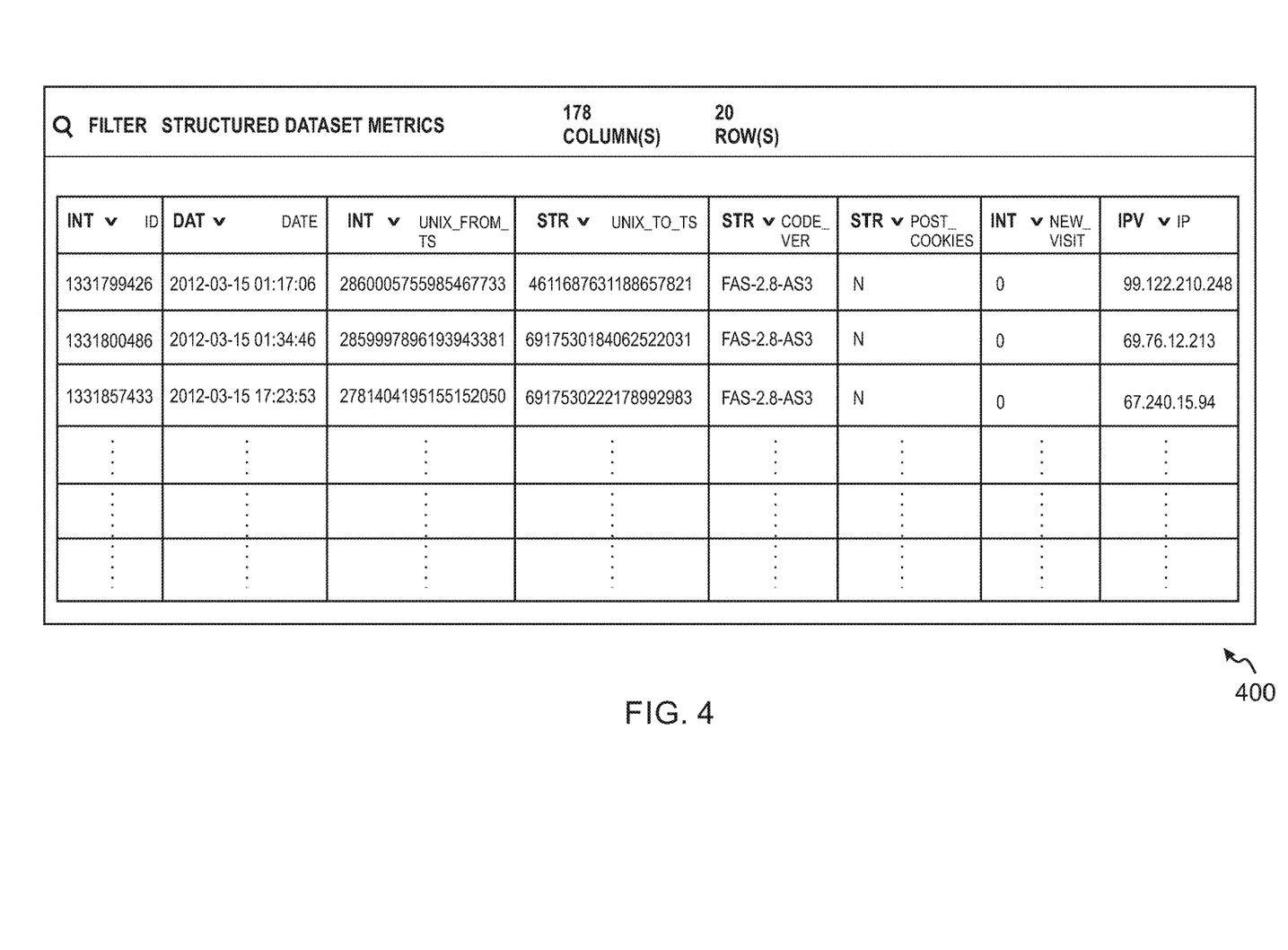
FIG. 4 shows an example representation of a dataset created from imported data, in accordance with an example embodiment of the invention.

FIG. 4 shows an example representation of a dataset 400 created from imported data, in accordance with an example embodiment of the invention. As explained with reference to FIGS. 2 and 3, an enterprise user may provide a user input related to the source (for example, a file name and a path) of a data store. The system 150 (shown in FIG. 2) may be configured to establish connection with the data store and import data from the data store. The imported data may automatically be parsed and formatted into rows and columns to create a dataset, such as the dataset 400. In an example scenario, the enterprise user may want to view a dataset corresponding to 'clickstream' data. The dataset 400 corresponds to a tabulated form of the clickstream data imported from a Web server (i.e. a data store). As can be seen, the dataset 400 includes several columns and rows. In at least some embodiments, the attributes derived from the imported data may configure the column headings. Additional information such as the minimum and maximum values in a column (or in a dataset), the top recurring values, and the like, may be stored as metadata corresponding to the dataset 400.

Referring now to FIG. 2, in at least some embodiments, the processing engine 202 may be configured to generate a knowledge graph corresponding to each dataset. As explained above, the data from the enterprise data universe may be imported from a plurality of data stores to configure a knowledge base, such as the knowledge base 206. One or more datasets may be created from the knowledge base, thereby configuring a catalog of data and metadata. A knowledge graph may be generated from the catalog of data and metadata corresponding to the each dataset. In at least some embodiments, the knowledge graph is a node-based structure including a plurality of nodes. One or more nodes from among the plurality of nodes are connected to one or more remaining nodes using respective edges. Further, in at least some embodiments, each node in the knowledge graph corresponds to an attribute in the dataset and each edge is configured to lead to a characteristic related to the respective attribute. The node-based structure of the knowledge graph and the traversal of the knowledge graph for determining response to queries of an enterprise user are explained next with reference to FIGS. 5 to 9.

Figure 5:
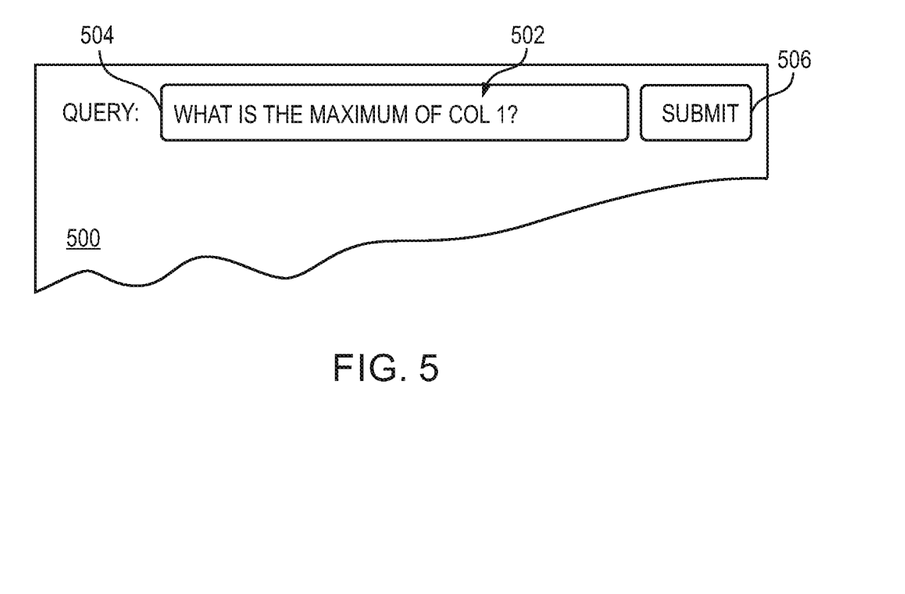
FIG. 5 shows an example query provisioned by an enterprise user, in accordance with an example embodiment of the invention.

FIG. 5 shows an example query 502 provisioned by an enterprise user, in accordance with an example embodiment of the invention. As explained with reference to FIG. 2, the user may provide source of data stores associated with the enterprise data universe to facilitate importing of data and creation of datasets. The enterprise user may further query the information stored in the knowledge base 206 to receive appropriate responses. The communication module 208 of the system 150 (shown in FIG. 2) may be configured to cause display of a user interface (UI) on an electronic device associated with a user subsequent to the successful login of the enterprise user into the system 150.

The UI may be embodied as a mobile application UI, a browser UI or any such thin client interface application UI. The user may utilize the user interface (UI) to provision one or more queries to the system 150. The one or more queries may be provided as sentences in a natural language format. In an example embodiment, the conversation with the user may be in a verbal form. In at least one example embodiment, speech processors may be inbuilt within the application associated with the UI to convert the queries received in a verbal form into a textual format. A portion of the UI displayed to the user is shown as UI 500 in FIG. 5.

The UI 500 is depicted to display a form field 504 capable of receiving a user input. The enterprise user may provide the query 502 in the form field 504 as shown in FIG. 5. The query 502 is depicted to be in natural language form and is exemplarily depicted to state 'WHAT IS THE MAXIMUM OF COL 1?'. The user may press the submit button 506 to provision the natural language query to the system 150. The communication module 208 of the system 150 may be configured to receive the natural language query and provision the query to the processing engine 202 for processing of the query. The processing of the query by the processing engine 202 is explained with reference to FIG. 6.

Figure 6:
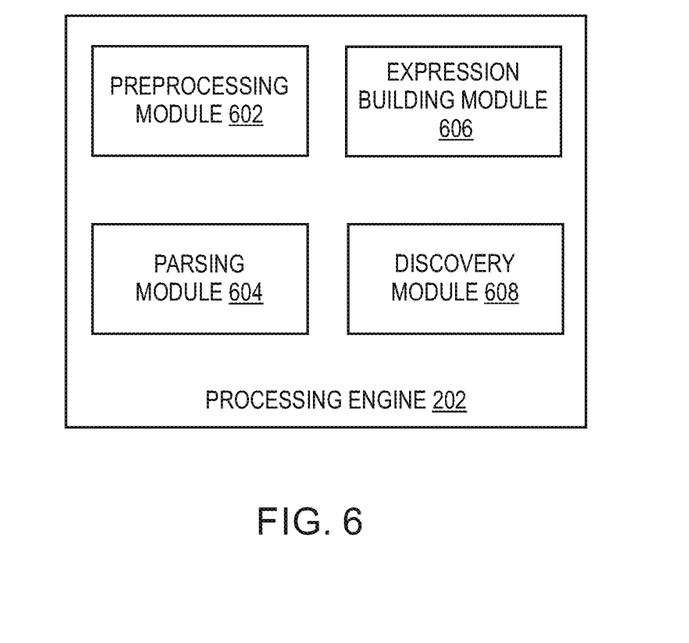
FIG. 6 shows a block diagram of a processing engine of the system of FIG. 2 to illustrate processing of the natural language query, in accordance with an example embodiment of the invention.

FIG. 6 shows a block diagram of the processing engine 202 of system 150 of FIG. 2 to illustrate processing of the natural language query, in accordance with an example embodiment of the invention. The processing of the natural language query by the processing engine 202 is explained hereinafter with reference to various modules implementing functionalities of the processing engine 202 of the system 150. It is to be appreciated that the modules as described herein can be implemented using one processor or multiple processors described in FIG. 2.

The processing engine 202 is configured to include a preprocessing module 602, a parsing module 604, an expression building module 606 and a discovery module 608. The preprocessing module 602, the parsing module 604, the expression building module 606 and the discovery module 608 may be communicably coupled with each other and the other components of the system 150 of FIG. 2, such as the memory 204, the knowledge base 206 and the communication module 208, shown in FIG. 2. It is noted that, in some embodiments, the processing engine 202 may be substituted by a combination of individual modules, such that the combination of individual modules perform similar functions as that by the processing engine 202. In such a scenario, the information retrieval system 150 of FIG. 2 may be configured using the memory 204, the knowledge base 206, the preprocessing module 602, the parsing module 604, the expression building module 606, the discovery module 608 and the communication module 208.

As explained with reference to FIG. 5, the enterprise user may provide the natural language query using a UI displayed on an electronic device associated with the user to retrieve information from the knowledge base 206. In an embodiment, the query may be routed to the preprocessing module 602, where the query may be pre-processed to identify a plurality of words (for example, bi-grams and tri-grams) that belong together or need to be looked at as a single word. The identification of words may be based on metadata stored in knowledge base 206. For example, 'Customer_Key' may be treated as a single word based on metadata stored in the knowledge base 206. The pre-processed query may be provided to the parsing module 604.

The parsing module 604 is configured to parse the pre-processed natural language query to generate a plurality of query elements. For example, for a query such as "What is the maximum of a column?", the parsing module 604 may parse the query into separate words such as "what", "is", "the", "maximum", "of", "a", "column".

The parsing module 604 is further capable of performing a grammar-based analysis of the plurality of query elements. In an embodiment, the parsing module 604 is configured to include a grammar parser for performing the grammar-based analysis of the plurality of query elements. In an embodiment, the grammar parser is a combinatory categorical grammar based parser. The combinatory categorical grammar based parser may be configured to classify the parsed words as one of an 'action', 'intent' or 'noun'. For example, for a set of parsed words such as: "what", "is", "the", "maximum", "of", "a", "column", the combinatory categorical grammar based parser may classify "what" as the action as it defines a question. Further, "maximum" may be classified as intent, and "column" may be classified as the noun, and may be made as part of the metadata while querying the knowledge base 206.

The parsing module 604 may further include trained probabilities of language with parts of speech module (not shown in FIG. 6), which is a pre-trained English language processor that includes metadata nouns and transitions. The combinatory categorical grammar based parser may refer to the metadata nouns and transitions stored within the trained probabilities of language with parts of speech module for purpose of classifying the parsed words as one of the action, intent or noun.

In an example embodiment, based on the classified parsed words, the parsing module 604 may be configured to invoke a help parser package. In case the classified parsed words of a query, lack a noun, and the intent is a defined keyword in the help parser package, a definition and help stored against the defined keyword in the help parser package may be provided to the user as an answer to the query. An example query that may result in invoking the help parser package is: "What is a dataset?" In this example, the parsed words may be "What", "is", "a", and "dataset". Out of the parsed words, the parsing module 604 using the combinatory categorical grammar based parser may classify "What" as the action, and the "dataset" being a defined keyword as the intent. As the parsed words lack a noun, and the Intent "dataset" is the defined keyword in the help parser package, the combinatory categorical grammar based parser may invoke the help parser package. Further, the definition provided in the help parser package for the defined keyword "dataset" may be provided to the user as an answer to the query "What is a dataset?". Other examples of queries that may result in invoking the help parser package include, "What is a Job?", "What is a workflow?", "What are derived attributes?" and the like. Aforesaid queries usually lack presence of the Noun. Presence of the Noun in the classified parsed words may result in computing of the expression as will be described below.

The expression building module 606 is configured to generate an expression based on the grammar-based analysis of the plurality of query elements. The expression building module 606 may use a parser package to provide an association between the classified action, intent and noun, and convert the classified action, intent and noun into an expression. In an illustrative example, the expression may have a following format Action(Intent(noun)). For example, for classified words such as "what" as the action, "maximum" as the intent and "column" as the noun, the expression may be computed as "What(maximum(column))".

The discovery module 608 is communicably coupled with the expression building module 606 and is configured to use the expression to retrieve at least one answer to the query from the knowledge base 206. In an embodiment, the discovery module 608 may be configured to evaluate the expression in an inside out manner.

In an embodiment, for evaluating the expression, the discovery module 608 may be configured to select a node from among the plurality of nodes in the knowledge graph based on the expression. The discovery module 608 may further be configured to traverse the knowledge graph along at least one edge associated with the selected node based on the expression to select a subsequent node in the knowledge graph. In an embodiment, the selected subsequent node in the knowledge graph corresponds to an answer to the query of the user. The traversal of the node is explained in further detail below:

In an embodiment, for evaluating the expression, a node corresponding to the noun of the expression may be looked up in the knowledge graph stored in the knowledge base 206. Further, an edge associated with the node that may correspond to the intent of the expression may be found in the knowledge base 206. Furthermore, a second node to which the edge points to in the knowledge base 206 may be determined. A noun corresponding to the second node may be provided as an answer to the query represented by the expression. A demonstrative knowledge graph stored in the knowledge base 206 used for evaluating the expression is explained with reference to FIG. 7.

Figure 7:
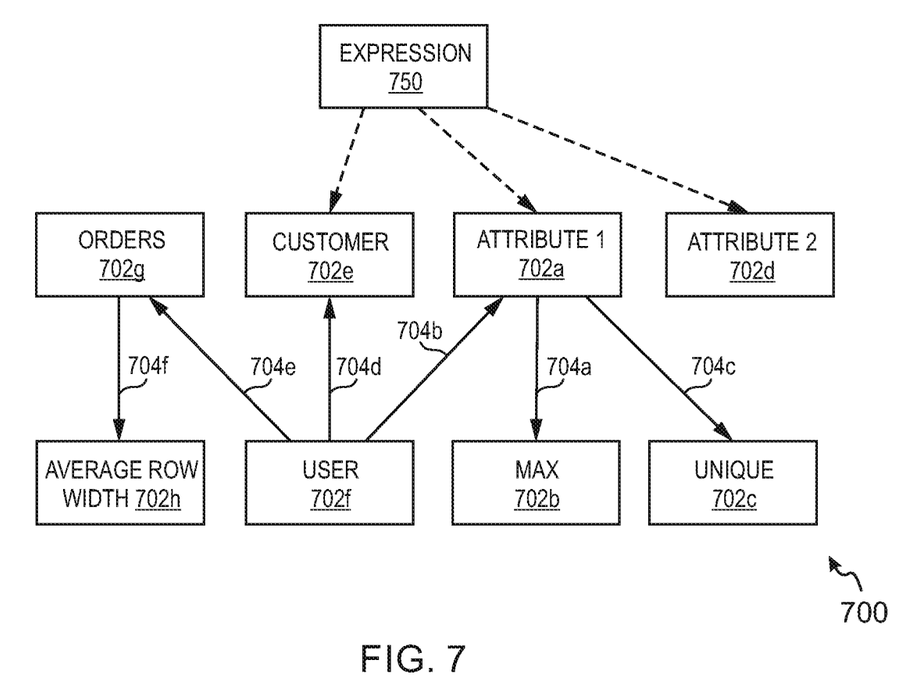
FIG. 7 shows a representation for illustrating a knowledge graph capable of facilitating information retrieval from a knowledge base, in accordance with an example embodiment of the invention.

FIG. 7 shows a representation for illustrating a knowledge graph 700 capable of facilitating information retrieval from the knowledge base 206, in accordance with an example embodiment of the invention. The knowledge graph 700 depicts plurality of nodes 702 *a-h* connected via a plurality of edges 704 *a-f*. Further, a node may be connected to another node via one or more edges such that, the nodes depict nouns (or attributes in the dataset such as column headings for instance) and the edges represent associated properties with the connected nouns, or more specifically each edge is configured to lead to a characteristic related to the respective noun/attribute. For example, a node such as node 702*f* depicting noun "user" may be connected with another node such as node 702*g* depicting a noun "orders" (i.e. a characteristic related to the noun 'user') via an edge 704*e* such that the edge 704*e* may correspond to an intent or associated properties between the "user" and the "orders" associated with the "user".

Further, for evaluating the expression of the form Action (Intent(Noun)) from the knowledge graph 700, the system 150 may initially select a node in the knowledge graph 700 that corresponds to the noun of the expression. The system 150, may further, determine an edge associated with the node that corresponds to the intent of the expression. Further, the system 150, may determine a second node to which the edge points to and may provide a second noun associated with the second node as an answer to the query represented by the expression. In an example embodiment, an expression 750 may take the form Action(Intent(Attribute 1)), in which case, the system 150 may locate a node that corresponds to attribute of name "Attribute 1". As shown in FIG. 7, Attribute 1 is located at node 702*a*. The system 150 may further determine an edge that corresponds to the intent of said expression 750. In case the edge 704*a* corresponds to the intent, then the node 702*b* being the node to which the edge 704*a* points to may be determined as the second node. As the node 702*b* corresponds to an attribute "max", the attribute "max" may be provided as an answer to a query represented by the example expression.

In an embodiment, the discovery module 608 (shown in FIG. 6) may be configured to provision the answer to the communication module 208 of the system 150. The communication module 208 may be configured to provision the answer to the enterprise user on the UI. An example answer provisioned to the user on the UI is depicted in FIG. 8.

Figure 8:
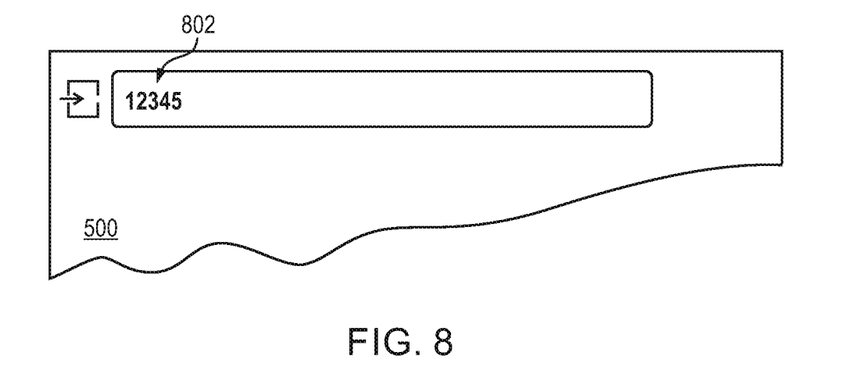
FIG. 8 shows an answer provided by the system in response to the query provisioned by the enterprise user, in accordance with an example embodiment of the invention.

FIG. 8 shows an answer 802 provided by the system 150 in response to the query provisioned by the enterprise user, in accordance with an example embodiment of the invention. As explained with reference to FIG. 5, an enterprise user may provision a query in natural language format on the UI displayed to the user on the electronic device associated with the user. The system 150, or more specifically, the processing engine 202 may be configured to receive the natural language query, parse the query into query elements, classify the query elements using a grammar-based parser and build a expression from the classified query elements. The expression may then be used to traverse a knowledge graph and retrieve one or more answers to the query. The natural language query as shown in FIG. 5 corresponds to 'WHAT IS THE MAXIMUM OF COL 1?'. The query may be processed to generate the expression 'what(maximum (col1))'. The expression may be used to select a node labeled 'col1' in the knowledge graph corresponding to a chosen dataset and retrieve the maximum value '12345' as answer 802 to the query 502. The answer 802 may be displayed to the user on the UI 500 as shown in FIG. 8.

A method for facilitating information retrieval is explained next with reference to FIG. 9.

Figure 9:
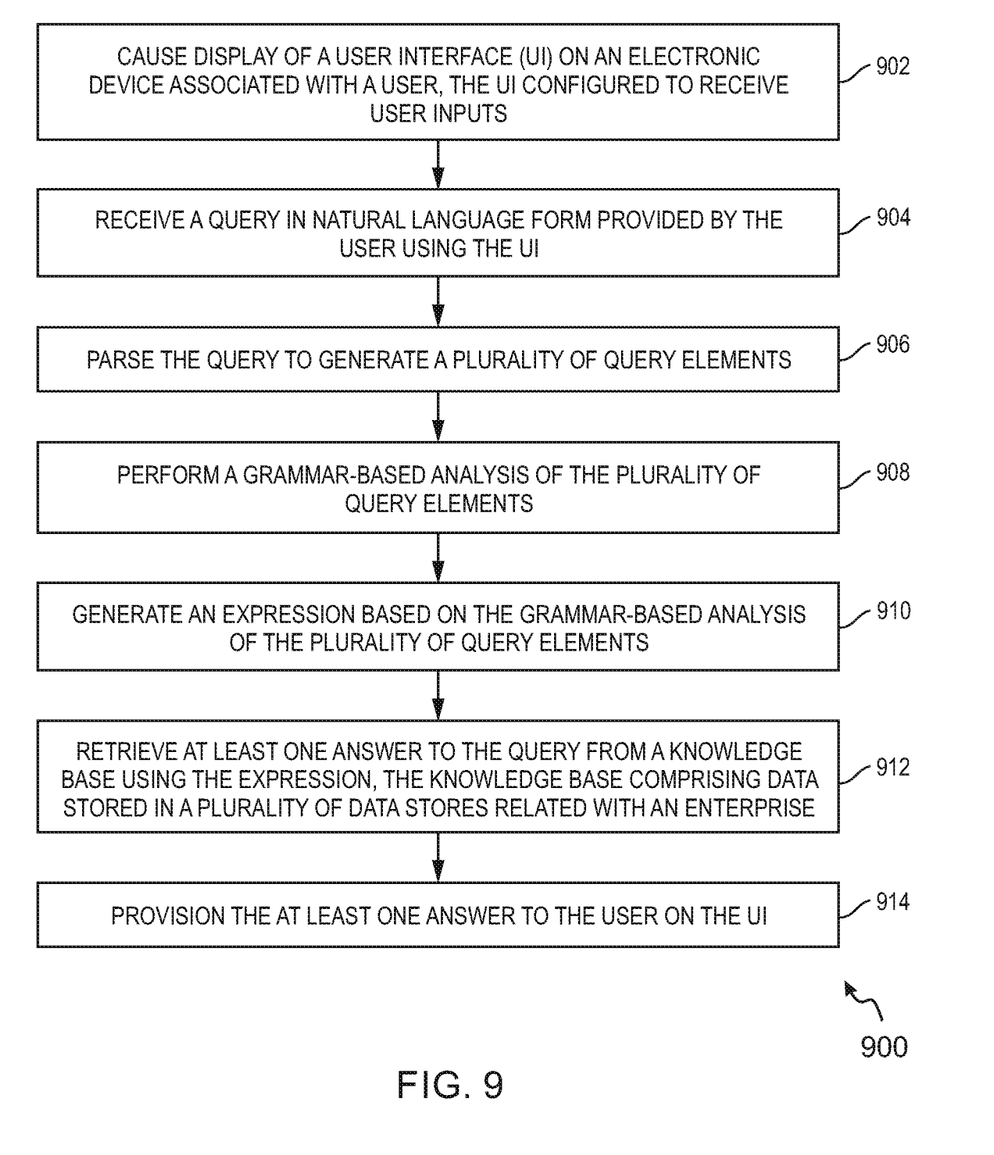
FIG. 9 is a flow diagram of a method for facilitating information retrieval, in accordance with an example embodiment of the invention.

FIG. 9 is a flow diagram of a method 900 for facilitating information retrieval, in accordance with an example embodiment of the invention. The various steps and/or operations of the flow diagram, and combinations of steps/operations in the flow diagram, may be implemented by, for example, hardware, firmware, a processor, circuitry and/or by the system 150 of FIG. 2 and/or by a different electronic device associated with the execution of software that includes one or more computer program instructions. The method 900 starts at operation 902.

At operation 902, display of a user interface (UI) on an electronic device associated with a user is caused. The UI is configured to receive user inputs, such as natural language queries. To that effect, the UI may include one or more form fields, such as the form field 504 shown on the portion of UI (i.e. on UI 500) in FIG. 5.

At operation 904, a query in natural language form provided by the user using the UI is received. For example, a natural language query such as "What is the minimum of orders file?" may be provisioned by the enterprise user. In an embodiment, the query may be pre-processed to identify words like 'orders_file', which may be looked at as a single word.

At operation 906, the query is parsed to generate a plurality of query elements. For example, the query "What is the minimum of orders file?" may be parsed to generate query elements (i.e. individual words) such as "What", "is", "the", "minimum", "of", "orders_file".

At operation 908, a grammar-based analysis of the plurality of query elements is performed. For example, the individual words may be classified as one of an action, intent or a noun, by a combinatory categorical grammar based parser. The combinatory categorical grammar based parser may refer to stored metadata of the trained probabilities of language with parts of speech module for the classification. In this example at operation 908, the classification of the individual words may be performed as follows: "What" may be classified as the action, "minimum" may be classified as the intent and "orders_file" as the noun.

At operation 910, an expression is generated based on the grammar-based analysis of the plurality of query elements. For example, the classified words may be converted into an expression by using a parser package. The expression may be computed as Action(Intent(Noun)). In this example, the expression may take the form "What(minimum(orders_file))".

At 912, at least one answer to the query is retrieved from a knowledge base, such as the knowledge base 206 explained with reference to FIG. 2, using the expression. The knowledge base includes data stored in a plurality of data stores related with an enterprise. The expression may be evaluated to determine an answer from the knowledge base. The knowledge base may include a knowledge graph (such as knowledge graph explained with reference to FIG. 7) including a plurality of nodes and edges. For an expression of the form Action(Intent(Noun)), a first node that corresponds to the noun in the expression may be looked for in the knowledge graph. Further, an edge that corresponds to the intent of the expression and associated with the first node is determined. Further, a second node, to which the edge points is determined and a noun associated with the second node may be provided as an answer to the query corresponding to the expression.

At operation 914, at least one answer is provisioned to the user on the UI. The method 900 stops at operation 914.

Figure 10:
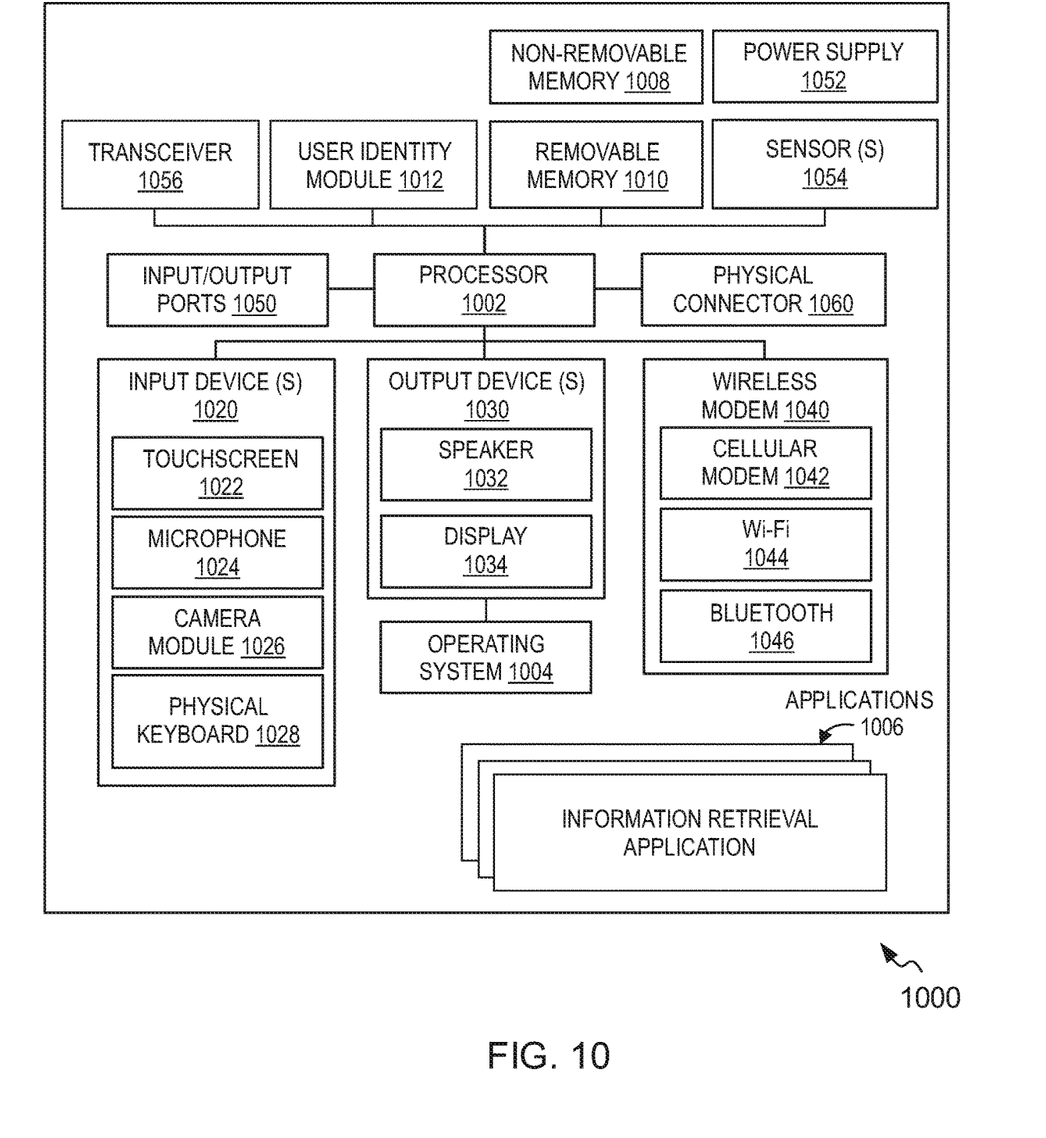
FIG. 10 shows an electronic device capable of implementing the various embodiments of the present invention.

FIG. 10 shows an electronic device 1000 capable of implementing the various embodiments of the present invention. In an embodiment, the various operations performed by the system 150 may be implemented using an application in an electronic device, such as the electronic device 1000. For example, the electronic device 1000 may correspond to an electronic device associated with an enterprise user, such as for example an information technology (IT) professional, a data scientist, a business analyst such as for example a retention analyst, a risk analyst or a marketing executive, or any such individual within the enterprise tasked with analyzing enterprise data for performing a variety of tasks, such as identifying trends, obtaining actionable insights, checking key metrics, and the like. The electronic device 1000 is depicted to include one or more applications 1006, including an information retrieval application, which serves as an instance of the application downloaded from the system 150 and capable of communicating through API calls with the system 150 to facilitate retrieval of information from a plurality of data stores associated with the enterprise data universe.

It should be understood that the electronic device 1000 as illustrated and hereinafter described is merely illustrative of one type of device and should not be taken to limit the scope of the embodiments. As such, it should be appreciated that at least some of the components described below in connection with that the electronic device 1000 may be optional and thus in an example embodiment may include more, less or different components than those described in connection with the example embodiment of the FIG. 10. As such, among other examples, that the electronic device 1000 could be any of a mobile electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the electronic device 1000 and support for one or more applications programs (see, applications 1006), such as information retrieval application, that implements one or more of the innovative features described herein. In addition to information retrieval application, the applications 1006 may include common mobile computing applications (e.g., telephony applications, email applications, calendars, contact managers, web browsers, messaging applications) or any other computing application. The information retrieval application, in at least one example embodiment, may be configured to facilitate information retrieval from a plurality of enterprise data stores using natural language queries, as explained with reference to FIGS. 1 to 9.

The illustrated electronic device 1000 includes one or more memory components, for example, a non-removable memory 1008 and/or removable memory 1010. The non-removable memory 1008 and/or removable memory 1010 may be collectively known as database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006.

The electronic device 1000 may further include a user identity module (UIM) 1012. The UIM 1012 may be a memory device having a processor built in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1000 can support one or more input devices 1020 and one or more output devices 1030. The input devices 1020 and the output devices 1030 configure the input/output (I/O) module for the electronic device 1000. Examples of the input devices 1020 may include, but are not limited to, a touch screen/a display screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include, but are not limited to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in the FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the electronic device 1000 and a public switched telephone network (PSTN). The wireless modem 1040 may in at least one example embodiment configure the communication module of the electronic device 1000.

The electronic device 1000 can further include one or more input/output ports 1050, a power supply 1052, one or more sensors 1054 for example, an accelerometer, a gyroscope, a compass, or an infrared proximity sensor for detecting the orientation or motion of the electronic device 1000, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added.

Various example embodiments offer, among other benefits, techniques for retrieving information from multiple data/knowledge sources in a conversational manner. The embodiments enable the user to provide the query in a conversational form using natural language thereby requiring minimum technical expertise and learning on behalf of the user. Further, the methods and systems described herein provide the user with correct answers, instead of providing suggestions to the answers. As a result, an easy lookup of data and metadata is achieved. Further, an easy access to enterprise data, metadata and computed information, through a human friendly interface, results in democratization of information to users.

Although the invention has been described with reference to specific exemplary embodiments, it is noted that various modifications and changes may be made to these embodiments without departing from the broad spirit and scope of the invention. For example, the various operations, modules, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 150 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    causing display of a user interface (UI) on an electronic device associated with a user, the UI configured to receive user inputs;
    receiving a query in a natural language form provided by the user using the UI;
    parsing the query to generate a plurality of query elements;
    performing a grammar-based analysis of the plurality of query elements by classifying the plurality of query elements as: action, intent, and noun;

generating an expression based on the grammar-based analysis of the plurality of query elements, wherein the action, the intent, and the noun are converted into the expression;

retrieving at least one answer to the query from a knowledge base using the expression, the knowledge base comprising data stored in a plurality of data stores related with an enterprise; and provisioning the at least one answer to the user on the UI.

2. The method as claimed in claim 1, further comprising:

receiving user input related to source of each data store from among the plurality of data stores related with the enterprise;

establishing connection with each data store using the user input related to the respective source; and importing data from each data store subsequent to establishing respective connection to configure the knowledge base.

3. The method as claimed in claim 2, further comprising:

generating one or more datasets from the data imported from each data store from among the plurality of data stores related with the enterprise.

4. The method as claimed in claim 3, further comprising:

generating a knowledge graph for each dataset from among the one or more datasets, the knowledge graph comprising a plurality of nodes, wherein at least one node from among the plurality of nodes is connected to one or more remaining nodes using respective edges, and wherein each node in the knowledge graph corresponds to an attribute in the dataset and each edge is configured to lead to a characteristic related to the respective attribute.

5. The method as claimed in claim 4, further comprising:

selecting a node from among the plurality of nodes in the knowledge graph based on the expression; and traversing the knowledge graph along at least one edge associated with the selected node based on the expression to select a subsequent node in the knowledge graph, wherein the selected subsequent node in the knowledge graph corresponds to an answer to the query of the user.

6. The method as claimed in claim 3, further comprising:

pre-processing the query prior to parsing the query, wherein pre-processing the query comprises identifying presence of one or more dataset terms in the query and, wherein the parsing of the query is performed based on the presence of the one or more dataset terms in the query.

7. The method as claimed in claim 1, wherein the parsing of the query and the grammar based analysis of the plurality of query elements is performed using a grammar parser.

8. The method as claimed in claim 7, wherein the grammar parser is a combinatory categorical grammar-based parser.

9. The method as claimed in claim 1, wherein the data stored in the plurality of data stores comprises structured data and unstructured data, and wherein the plurality of data stores comprises one or more relational databases, one or more file systems, one or more on-premise data storage systems and one or more cloud-based data storage systems.

10. An information retrieval system, comprising:

a knowledge base configured to comprise data imported from a plurality of data stores related with an enterprise;

at least one processing engine communicably coupled with the knowledge base; and a memory having stored therein machine executable instructions, that when executed by the at least one processing engine, cause the information retrieval system to:

cause display of a user interface (UI) on an electronic device associated with a user, the UI configured to receive user inputs;

receive a query in a natural language form provided by the user using the UI;

parse the query to generate a plurality of query elements;

perform a grammar-based analysis of the plurality of query elements, by classifying the plurality of query elements as: action, intent, and noun;

generate an expression based on the grammar-based analysis of the plurality of query elements, wherein the action, the intent, and the noun are converted into the expression;

retrieve at least one answer to the query from the knowledge base using the expression; and provision the at least one answer to the user on the UI.

11. The information retrieval system as claimed in claim 10, wherein the information retrieval system is further caused to:

receive user input related to source of each data store from among the plurality of data stores related with the enterprise; and establish connection with each data store using user input related to the respective source; and import data from each data store subsequent to establishing respective connection to configure the knowledge base.

12. The information retrieval system as claimed in claim 11, wherein the information retrieval system is further caused to:

generate one or more datasets from the data imported from each data store from among the plurality of data stores related with the enterprise.

13. The information retrieval system as claimed in claim 12, wherein the information retrieval system is further caused to:

generate a knowledge graph for each dataset from among the one or more datasets, the knowledge graph comprising a plurality of nodes and, wherein at least one node from among the plurality of nodes is connected to one or more remaining nodes using respective edges, and wherein each node in the knowledge graph corresponds to an attribute in the dataset and each edge is configured to lead to a characteristic related to the respective attribute.

14. The information retrieval system as claimed in claim 13, wherein the information retrieval system is further caused to:

select a node from among the plurality of nodes in the knowledge graph based on the expression; and traverse the knowledge graph along at least one edge associated with the selected node based on the expression to select a subsequent node in the knowledge graph, wherein the selected subsequent node in the knowledge graph corresponds to an answer to the query of the user.

15. The information retrieval system as claimed in claim 12, wherein the information retrieval system is further caused to:

pre-process the query prior to parsing the query, wherein pre-processing the query comprises identifying presence of one or more dataset terms in the query and, wherein the parsing of the query is performed based on the presence of one or more dataset terms in the query.

16. The information retrieval system as claimed in claim 10, wherein the at least one processing engine includes a grammar parser for parsing of the query for performing the grammar-based analysis of the plurality of query elements.

17. An information retrieval system, comprising:
a knowledge base configured to comprise data imported from a plurality of data stores related with an enterprise;
a parsing module configured to parse a natural language query of a user to generate a plurality of query elements, the natural language query provided by the user using a user interface (UI) displayed on an electronic device associated with the user to retrieve information from the knowledge base, the parsing module capable of performing a grammar-based analysis of the plurality of query elements by classifying the plurality of query elements as: action, intent, and noun;
an expression building module communicably coupled with the parsing module, the expression building module configured to generate an expression based on the grammar-based analysis of the plurality of query elements, wherein the action, the intent, and the noun are converted into the expression; and
a discovery module communicably coupled with the expression building module and the knowledge base, the discovery module configured to retrieve at least one answer to the query from the knowledge base using the expression, wherein the at least one answer is provisioned to the user on the UI.

18. The information retrieval system as claimed in claim 17, wherein the parsing module is configured to generate one or more datasets from the data imported from each data store from among the plurality of data stores related with the enterprise.

19. The information retrieval system as claimed in claim 18, wherein a knowledge graph is generated for each dataset from among the one or more datasets, the knowledge graph comprising a plurality of nodes and, wherein at least one node from among the plurality of nodes is connected to one or more remaining nodes using respective edges, and wherein each node in the knowledge graph corresponds to an attribute in the dataset and each edge is configured to lead to a characteristic related to the respective attribute.

20. The information retrieval system as claimed in claim 19, wherein the discovery module is configured to:
select a node from among the plurality of nodes in the knowledge graph based on the expression; and
traverse the knowledge graph along at least one edge associated with the selected node based on the expression to select a subsequent node in the knowledge graph, wherein the selected subsequent node in the knowledge graph corresponds to an answer to the query of the user.

* * * * *